United States Patent [19]
Ratajski

[11] 3,978,710
[45] Sept. 7, 1976

[54] APPARATUS FOR DETERMINING THE DEGREE OF GAS IMPERMEABILITY FOR WATCH CASES AND THE LIKE ARTICLES

[75] Inventor: Michel Ratajski, Bienne, Switzerland

[73] Assignee: OMEGA Louis Brandt & Frere S.A., Bienne, Switzerland

[22] Filed: July 9, 1975

[21] Appl. No.: 594,543

[30] Foreign Application Priority Data

July 12, 1974 Switzerland ........................ 9613/74

[52] U.S. Cl. ................................................ 73/49.3
[51] Int. Cl.[2] ........................................... G01M 3/32
[58] Field of Search .................... 73/40, 49.3, 398 C

[56] References Cited

UNITED STATES PATENTS 2,924,965 2/1960 Westerheim ........................... 73/40
3,158,028 11/1964 Chope ............................... 73/398 C

*Primary Examiner*—S. Clement Swisher
*Attorney, Agent, or Firm*—Griffin, Branigan and Butler

[57] ABSTRACT

An apparatus for testing the gas impermeability of watch cases or other small articles comprises two enclosures. A bellows forms part of a hermetic separation between the enclosures, the bellows serving to move the movable plate of a variable condenser. The condenser is connected in an oscillator circuit to vary the oscillator frequency in accordance with the differential pressures between the two enclosures. The oscillator output frequency is compared with the output frequency of a stable frequency generator to provide a measurement indication. A watch case is placed within one enclosure and both enclosures brought to equal pressures after which the measurement of gas impermeability may begin.

3 Claims, 1 Drawing Figure

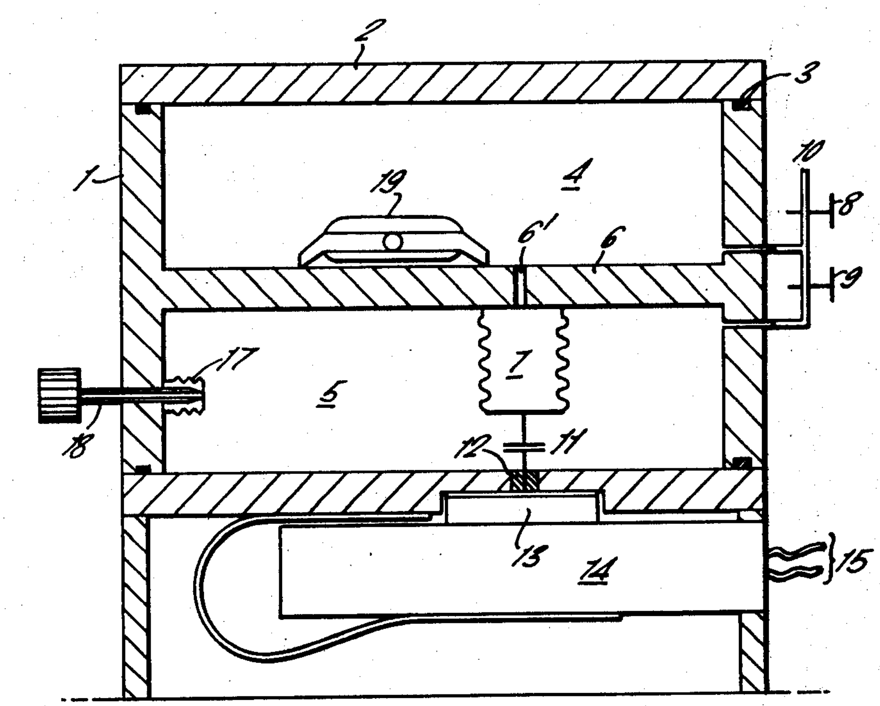
2
3
1
10
19
4
8
6'
6
9
17
7
5
18
12
11
13
14
15

APPARATUS FOR DETERMINING THE DEGREE OF GAS IMPERMEABILITY FOR WATCH CASES AND THE LIKE ARTICLES

The invention concerns an apparatus for non-destructive testing and measuring the gas impermeability of watch cases and similar small articles.

It is known to effect such testing by placing the article to be tested within a sealed enclosure under gaseous pressure and to measure the variation of pressure within the enclosure owing to leaks in the article. Such measurement for which the principle is described in the review "Zeitschrift fur Instrumentenkunde", volume 74, No. 5, May 1966, pages 145 – 149, is generally accomplished by comparing the pressure within the testing enclosure and a reference enclosure by means of a differential manometer.

The variation disclosed in the French published patent application No. 2,148,466 indicates inter alia the serious difficulty resulting from the necessity of providing within the reference enclosure of an article assumed to be perfect identical to the article undergoing testing and which serves as standard. The type of manometer utilized is moreover not indicated.

The process described in French patent No. 1,278,664 which may be adapted for use in respect of watch cases, although not requiring a reference article as standard, nevertheless, requires the use of a liquid as a sealing means between the enclosures in conjunction with a differential manometer utilizing a liquid and such arrangement practically excludes the utilization thereof for series testing.

Efforts have been made in order to display the differential pressure and thus the impermeability in the form of an electrical value by utilization of the movement of a bellows or membrane brought about by pressure variation in order to modify an electrical parameter such as an inductance or a capacitance. This latter possibility which is by far the most suitable to be easily employed is described in the "Journal suisse d'horlogerie, 1968, No. 9/10, pages 325 – 328. An elastic membrane separates the testing enclosure and the comparison enclosure and constitutes one electrode of a condenser of which the other electrode is fixed. The pressure variation brought about by a failure of impermeability of the article is compensated by a correcting system employing a piston and a cylinder and the resulting variation in capacity is measured by a bridge circuit. This, however, constitutes a return to zero method, delicate in its application, which provides an analog type of measurement and requires great care on the part of the operator. Thus, effectively, it comprises more a laboratory instrument than an industrial testing instrument. This arrangement, moreover, is indicated for a pressure not exceeding 6 bars and will not indicate volume changes greater than 10 $mm^3$.

The present invention proposes an apparatus for testing and measuring in an industrial fashion the degree of impermeability of watch cases or like articles which avoids the difficulties and limitations of the prior art arrangements thus providing an improved sensibility relative to the latter and which operates in a much greater pressure range and finally provides results in digital form thus directly and immediately useful.

The arrangement in accordance with the invention comprises two enclosures hermetically separated from one another by detecting means movable or deformable in response to differential pressures, both enclosures being simultaneously pressurized or evacuated to the same pressure with one enclosure receiving the article to be tested so that penetration of gas therein or escape of gas therefrom effects a differential pressure between the two enclosures thereby provoking displacement of the detecting means wherein the detecting means is arranged to displace a first member relative to a second fixed member, the two members forming the elements of a variable condenser, an electrical oscillating circuit adapted to be tuned by the condenser so that variations in the oscillation frequency are representative of the degree of impermeability of the article undergoing testing and measuring and display apparatus adapted to indicate the oscillation frequency variation.

For better understanding of the following description reference is made to the attached drawing wherein a single FIGURE represents in schematic form an apparatus in accordance with the invention.

The arrangement as shown comprises a support on which is mounted a cylindrical body 1 in which are provided two enclosures 4 and 5. The upper enclosure 4 is hermetically sealed with reference to the exterior by a cover member 2 arranged to compress a ring seal 3. The two enclosures 4, 5, are impermeably isolated from one another by a fixed partition 6. A duct 6' in partition 6 enables communication of the upper enclosure 4 with the interior of an impermeable elastic bellows 7 rigidly fastened at its base to partition 6 and placed within the lower enclosure 5.

Both enclosures 4, 5 may be connected simultaneously or separately by means of ducts provided with valves 8, 9 and a common duct 10 with a source of gas at a pressure above or below atmospheric or directly with the atmosphere.

Fixed to the free end of bellows 7 and perpendicular to its axis is a first member which may cooperate with a second member fixed relative to the lower enclosure 5 and parallel to the first member: the two members together form a condenser 11, the first is electrically coupled to body 1 through bellows 7 and partition 6. A conductor coupled to the second element passes through the base of lower enclosure 5 by an insulating sealed passage 12 and connects condensor 11 to an electrical circuit 13 which with condensor 11 constitutes an oscillating circuit. The frequency of oscillation of this circuit may be determined by a measuring apparatus 14 coupled to a display 15. It is evident that in place of bellows 7 any means which is moveable or deformable in response to a differential pressure between the two enclosures 4, 5 may be utilized. This for example could comprise a simple membrane or Bourdon tube or a piston and cylinder wherein the first element will follow the displacements of the means employed.

A further bellows arrangement 17 and a fine adjustment screw 18 enable adjustment of the volume of enclosure 5 at the start of the test.

A watch case to be tested 19 being placed in the upper enclosure 4 which is thereafter sealed and both enclosures 4, 5 being then brought to the same pressure by valves 8 and 9 it is evident that if there is penetration of gas into the article 19 or escape therefrom a pressure differential between the enclosures 4 and 5 will result. The latter will bring about an extension or shortening of bellows 7 and thereby a change in the capacity of condenser 11 as will be displayed by a frequency variation of the oscillating circuit 13. Such variation represents a leakage rate of the article undergoing testing and it is sufficient thus to measure it at the end of the testing period.

Such measurement may be effected through comparison with a stable reference frequency provided by a time base within the display and measuring apparatus 15, the frequency of the oscillating circuit 13 being calibrated at the beginning of the testing with that of the time base in order to display a zero spread.

Since the main interest is to test watches through a frequency variation it seems useful to consider whether it is possible to utilize with or without adaptation existing apparatuses for testing the precision of the watch movement. To this end it is advantageous to use as oscillating circuit 13 a timekeeping electronic oscillator in which the variable condenser 11 takes the place of the usual trimmer and to provide the reference frequency likewise by an electronic timekeeping oscillator preferably of the same type as the former. While any oscillator taken from a quartz type watch will suffice, a preferred embodiment has utilized the oscillator described in U.S. Pat. No. 3,585,527. Frequency comparison may be accomplished as shown in U.S. Pat. No. 3,857,274. It is thus possible to foresee the use of a chrono-comparator available at many retail establishments and to measure the difference in frequency between the first oscillator and that which serves as standard. From the fact that the measurement is effected by comparison of two frequencies, thus of two pulse trains during an equal time period, the difference in frequency may be directly obtained in digital form. It is clear that following the comparison such figures may directly indicate the leakage rate of the article undergoing testing.

In practice, the impermeability test proceeds as follows: The upper enclosure 4 is hermetically closed following introduction of the watch case 19, valves 8 and 9 are open thereby placing both enclosures 4, 5 at the same pressure either above or below ambient pressure for the testing. Valve 8 of the upper enclosure is thereafter closed initially, then following a period of time to permit temperature equalization and any deflection in the crystal portion of case 19 to take place, valve 9 is closed. The frequency of oscillator 13 is calibrated according to the reference frequency of the measuring and display apparatus 15 by adjustment of the volume of the lower enclosure 5 by means of adjustment screw 18. At the end of the time period necessary for the measurement the operation of oscillator 13 representing the degree of impermeability of case 19 is noted. Following emptying of enclosures 4, 5 by duct 10 the tested case 19 may be removed.

I claim:

1. An apparatus for testing the gas impermeability of watch cases or like objects, said apparatus comprising:

a first enclosure for receiving the article to be tested;

a second enclosure;

means including a means within one of said enclosures and deformable in response to differential pressures for hermetically separating said first and second enclosures;

a variable condenser having a fixed member and a movable member connected to said deformable means;

an electrical oscillator circuit frequency tunable by said variable capacitor;

means for simultaneously pressurizing or evacuating both said enclosures to the same pressure whereby escape of gas from the article being tested effects a differential pressure between said two enclosures thereby deforming said deformable means and moving said movable member to thereby vary the frequency of said electrical oscillator circuit; and measuring and display means for providing an indication of variations in said oscillator circuit frequency, said measuring and display means including a stable frequency generator and comparator means for comparing the frequency of said oscillator circuit with the frequency of said stable frequency generator.

2. Apparatus according to claim 1 wherein the stable frequency generator comprises an electronic oscillator.

3. Apparatus according to claim 2 wherein the stable frequency electronic oscillator is that of an apparatus used for testing the operating precision of timepiece oscillators of the same type as itself.

* * * * *